United States Patent
Villwock

(10) Patent No.: US 10,051,146 B2
(45) Date of Patent: *Aug. 14, 2018

(54) VERIFIABLE CHECK AND SECURITY DOCUMENT SYSTEM

(71) Applicant: Thomas Villwock, San Diego, CA (US)

(72) Inventor: Thomas Villwock, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/072,621

(22) Filed: Mar. 17, 2016

(65) Prior Publication Data

US 2016/0198063 A1 Jul. 7, 2016

Related U.S. Application Data

(63) Continuation of application No. 13/250,489, filed on Sep. 30, 2011, now Pat. No. 9,323,485.

(Continued)

(51) Int. Cl.
| | |
|---|---|
| *B42D 25/382* | (2014.01) |
| *B42D 25/29* | (2014.01) |
| *B42D 25/369* | (2014.01) |
| *B42D 25/387* | (2014.01) |
| *H04N 1/32* | (2006.01) |

(Continued)

(52) U.S. Cl.
CPC ......... *H04N 1/32304* (2013.01); *B42D 25/29* (2014.10); *B42D 25/369* (2014.10); *B42D 25/382* (2014.10); *B42D 25/387* (2014.10); *G06F 3/1208* (2013.01); *G06F 3/1222* (2013.01); *G06F 3/1242* (2013.01); *G06F 3/1243* (2013.01); *G06F 3/1244* (2013.01); *G06F 3/1268* (2013.01); *G06F 3/1288* (2013.01); *G06Q 20/042* (2013.01); *H04N 1/00851* (2013.01); *H04N 1/00875* (2013.01); *H04N 2201/3235* (2013.01); *H04N 2201/3239* (2013.01); *H04N 2201/3242* (2013.01)

(58) Field of Classification Search
CPC .... G06F 3/1208; G06F 3/1222; G06F 3/1242; G06F 3/1244; G06F 3/1268; G06F 3/1288; G06Q 20/042; H04N 1/00851; H04N 1/00875

See application file for complete search history.

(56) References Cited

U.S. PATENT DOCUMENTS

| | | | | |
|---|---|---|---|---|
| 5,347,302 | A * | 9/1994 | Simonoff | G03G 15/326 347/139 |
| 2002/0122568 | A1* | 9/2002 | Zhao | G06F 21/10 382/100 |

(Continued)

*Primary Examiner* — Frantz Bataille
(74) *Attorney, Agent, or Firm* — Wagenknecht IP Law Group, PC

(57) ABSTRACT

A secured document with a security architecture having a plurality of security elements for authentication, wherein at least one security element is printed indicia that is magnetizable and not visible within a visible spectrum. Verifiable document security systems including a validation center that performs a verification cycle to verify transaction data between an issuer and a recipient and generates a security architecture having a plurality of security elements for printing on a document, wherein the verification cycle is performed before and after printing a document with the security elements; and a printer with an ink suite communicatively coupled to the validation center and configured to print the security architecture on the document.

22 Claims, 6 Drawing Sheets

Related U.S. Application Data

(60) Provisional application No. 61/389,033, filed on Oct. 1, 2010.

(51) Int. Cl.
*G06F 3/12* (2006.01)
*G06Q 20/04* (2012.01)
*H04N 1/00* (2006.01)

(56) References Cited

U.S. PATENT DOCUMENTS

| | | | |
|---|---|---|---|
| 2004/0080777 A1 | 4/2004 | Smith | |
| 2005/0242297 A1* | 11/2005 | Walker | G06K 19/086 250/461.1 |
| 2007/0178295 A1* | 8/2007 | Haas | B32B 5/18 428/304.4 |
| 2007/0285723 A1* | 12/2007 | Fabel | G06Q 20/04 358/1.18 |
| 2008/0010215 A1* | 1/2008 | Rackley, III | G06Q 20/042 705/70 |
| 2009/0087077 A1* | 4/2009 | Nireki | G07D 7/12 382/135 |
| 2009/0213161 A1 | 8/2009 | Murai | |
| 2009/0279143 A1* | 11/2009 | St. Jacques, Jr. | G06F 21/608 358/3.28 |

* cited by examiner

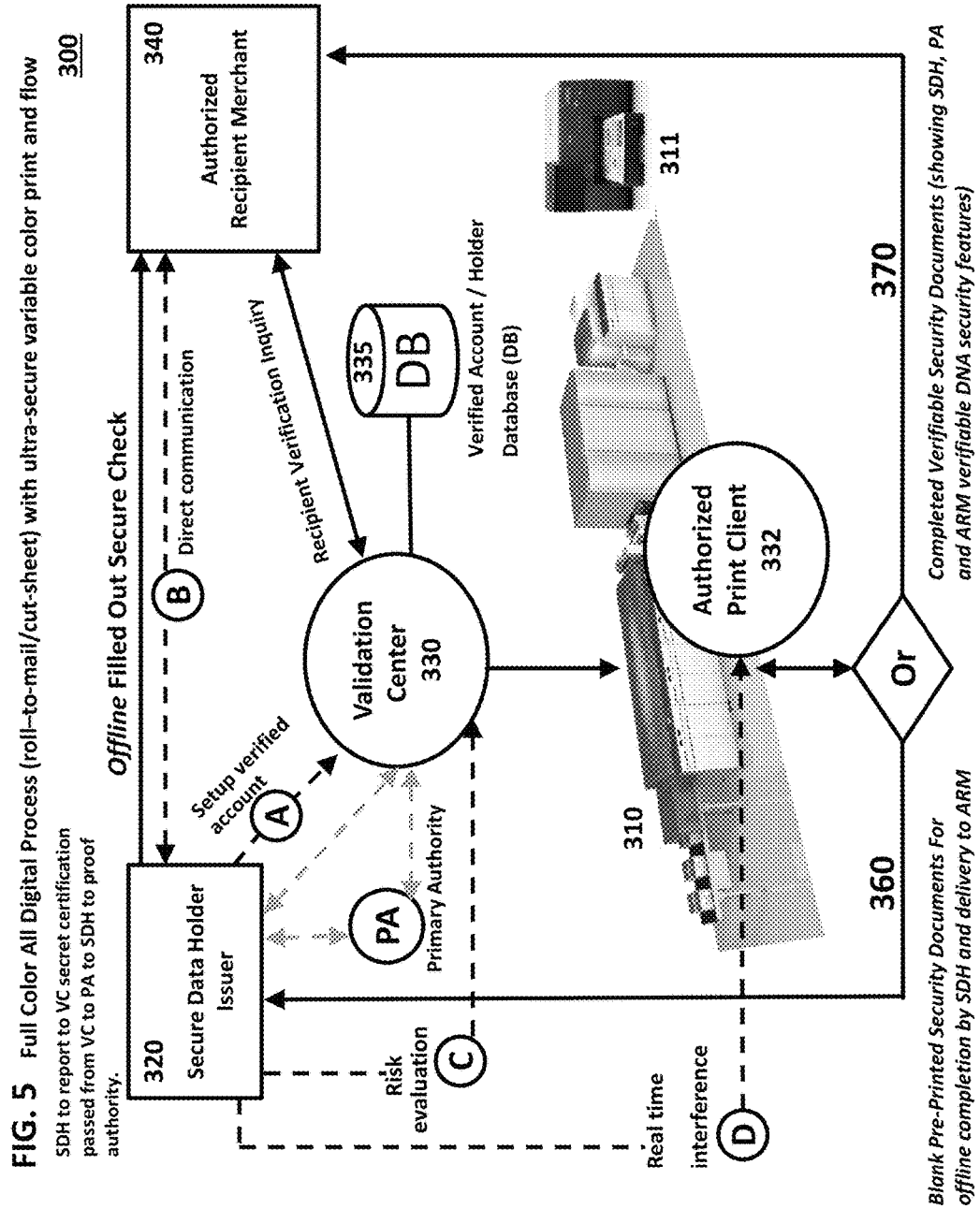
FIG. 5  Full Color All Digital Process (roll-to-mail/cut-sheet) with ultra-secure variable color print and flow

USE CASE: DNA SECURE CHECK PROCESSING WITH FRAUD PREVENTION

| 1. VC SD REGISTRATION PROCESS | 2. VC DATA VERIFICATION CYCLE BEFORE or WHILE SD ARE PRINTED | 3. VC DATA VERIFICATION CYCLE AFTER SD WERE PRINTED AND HAVE BEEN CIRCULATED | 4. SDH INTERFERENCE OPTIONS IN THE EVENT OF UNAUTHORIZED SD PRINT |
|---|---|---|---|
| • SDH passes secure data (SD) to VC | • SDH passes SD to ARM and/or APC | • SDH passes DNA printed SD to ARM (after self creation or receipt of blank SD through APC) | • Inform ARM/APC of unauthorized activity, reversal/halt of underlying transaction |
| • VC passes SD to PA plus secret token (ST) | • ARM and/or APC make request to VC. | • ARM make request to VC (enters SD online by scan or manually). | • Inform PA to flag SD as compromised and halt SD processing. |
| • PA validates SD and passes ST to SDH. | • VC queries and denies/confirms | • VC queries and denies/confirms | • Inform VC to flag SD as compromised |
| • SDH passes ST back to VC. | • ARM and/or APC print SD with DNA security | • SDH is: a) alerted in real-time of circulated printed SD and notified of unique transaction details and ID of ARM and/or APC; OR b) receives DNA printed SD through PA (canceled check) with DNA secure features, incl. VC verification contact data and options to prevent/interfere. | • Originate new SD |
| • If all successful: SDH validated, SD, ST and SDH real-time alert method stored in VCDB | • SDH is alerted in real-time of print event and notified of unique transaction details and ID of ARM and/or APC. | | |
| | • ARM and/or APC are made aware of VC's SDH alert notification. | • ARM is made aware of VC's SDH alert notification. | |
| | • SDH is informed and has options to interfere. Non interference signals transaction validity to ARM and/or APC. | • SDH is informed and has option to interfere. Non interference signals transaction validity to ARM. | |

FIG. 6

VERIFIABLE CHECK AND SECURITY DOCUMENT SYSTEM

CROSS REFERENCE TO RELATED APPLICATIONS

This application is a continuation of U.S. patent application Ser. No. 13/250,489, filed Sep. 30, 2011, which claims benefit of priority to U.S. patent application Ser. No. 61/389,033, filed on Oct. 1, 2010; the contents of each are herein incorporated by reference in their entirety.

TECHNICAL FIELD

The invention relates generally to the generation of secured documents and their authentication and more specifically to a verifiable check and security document system that provides a validation center to generate security architectures for the printing of documents. The security document system invented herein establishes further security by validating or authenticating secure information prior to and following the placement on the document, which includes an interactive alert propagation, detection and prevention system associated with any unauthorized print of data before and after printing.

BACKGROUND OF THE INVENTION

With the recent technological advances in imaging and document printing, forging of documents has become increasingly prevalent. For instance, color scanners now available for home use can accurately capture color variations depicted in many checks, graphics software can accurately reproduce security images and high resolution printing can print forged security features with increased precision.

One attempt to avoid document forgery has been the adoption of magnetic inks. Magnetic ink character recognition (MICR) not only permits automated entry of data by banking institutions but also provides an added level of complexity for forgers. However, a variety of magnetic ink formulations and methods of their preparation are publicly available and the ability to fill print cartridges with these formulations is becoming increasingly easy. Accordingly, there remains a need to provide improved security features to ensure the authentication of documents before printing as well as tracking and validation after the document has been printed

SUMMARY OF THE INVENTION

The present invention addresses the need for improved systems for the generation and authentication of documents, such as checks, and provides related benefits. This is accomplished through the formation of a verifiable document security system. Among the main features of the system presented herein is a validation center capable of (a) generating security architectures for use with secured documents such as checks, coupled with (b) transactional communications with both issuer and recipient prior to the printing and delivery of the secured document as well as following and tracking after printing. The improved secure system presented here has the added feature of tracking and reviewing/validating the information following the printing of the secure document. In this follow-up approach, an interactive alert propagation, detection and prevention system is employed within the secure system. The potential security threats and risks are carefully assessed in every situation.

In regards to the generation of a security architecture and its printing domain, the validation center creates a security architecture by pre-determining the arrangement of sensitive information such as indicia for printing in a secure media and in a secure print configuration. Once the security architecture is generated, the validation center can instruct printing of the secured document using an all digital full color printing means having a security ink suite. The resulting document includes sensitive information printed in a secure configuration with multiple positions in a non-linear fashion using secure print media, which is designed to be anti-counterfeit and requires detection and recognition of characters beyond normal or obvious means, such as by energy excitation or detection outside of the visible spectrum to reveal the sensitive information. Information provide as indicia is printed using fluids such as visible fluid, non-visible fluid, visible or non-visible magnetic fluid, ultraviolet (UV) excitable fluid, infrared (IR) excitable fluid (including near, mid and far infrared), x-ray excitable, gamma ray excitable, electron beam (EB) excitable, fluorescent fluids and a visible or non-visible nucleic acid solution. The secure print configurations include variations in size compared to an initial size, a non-linear configuration, a curved configuration and an angled configuration.

For a secondary form of security beyond the secure print media, communication with the verification center is a mandatory procedure where communication with both the issuer and recipient or authorized agents thereof is required to confirm the authenticity of the information related to the transaction. Sensitive information can therefore be suitably confirmed prior to the generation of a secured document.

In another aspect of the invention, a secured document, such as a check, is provided. This document includes a multi-presence of sensitive information, such as multiple printings of the unique check number and bank account information along the document in random non-linear patterns and it is printed in fluids, such as secure print media, that require advanced detection by energy excitation or detection by unordinary means, outside of the visible spectrum to reveal the sensitive information. Examples of suitable fluids include colorless magnetic fluids, UV fluids, EB fluids, IR fluids, fluorescent fluids, nucleic acid fluids and the like.

The follow-up aspect of the invention addresses the tracking and integrity of the documents after the documents are printed. The validation center incorporates the security function of prevention, where the value of the system is not only its ability to prevent the printing of unauthorized/non-authenticated data, but also to prevent harm AFTER the secure data may have been printed despite all efforts to prevent its unauthorized output.

BRIEF DESCRIPTION OF THE DRAWINGS

FIG. 5 is a more defined flow chart and schematic further illustrating the value of the invented system showing steps taken prior to printing by the validation center 330 and in addition to its ability to prevent the print of unauthorized/non-authenticated data, it is shown in the schematic that it is also designed to prevent harm AFTER the secure data may have been printed despite all efforts to prevent its unauthorized output. In FIG. 5, interaction (A) with the Validation Center 330 transmits Recipient and Authorized Print Client Verification Request Contact Data for tracking, authentication and interference. In interaction (B) Secure Data Issuer 320 may engage in direct dialog with Recipient 340 upon verification request to interfere, halt, dispute etc. Additionally, in interaction (C) the Secure Data Holder 320 communicates secure data compromise, abuse, status update regarding data integrity and risk of processing. Another embodiment of the invention interaction (D) allows the Secure Data Holder 320 to interfere with authorized print client 332 upon Real-Time Validation Center Notification. Lastly, the implementation of the Primary Secure Data Authority (PA) to assist in authentication (e.g.: Bank—authenticate digitized signature, entered online) is employed.

FIG. 6 is an overview of the primary uses of the invention for secure check processing with fraud prevention. (1) The process begins with the registration process of the secure data (SD) by the secure data holder (SDH) to the validation center (VC). (2) Next the VC begins a cycle for verifying data before and during SD entry, processing, and printing. This includes information validation/authentication of secure data sent from the SDH to the authorized recipient merchant (ARM) or authorized print client (APC), which will be checked by the VC. The cycle will revolve between the SDH-VC-ARM/APC by notifications. (3) Following printing, the VC begins a follow-up cycle after the SD has been circulated and VC will provide SDH the option to interfere based on alert notifications or interference signals. (4) In the case of unauthorized SD there will be a reversal/halt of the transaction, a primary authority (PA) will be notified and the SD will be flagged by PA and VC.

DETAILED DESCRIPTION OF THE INVENTION

Figure 1:
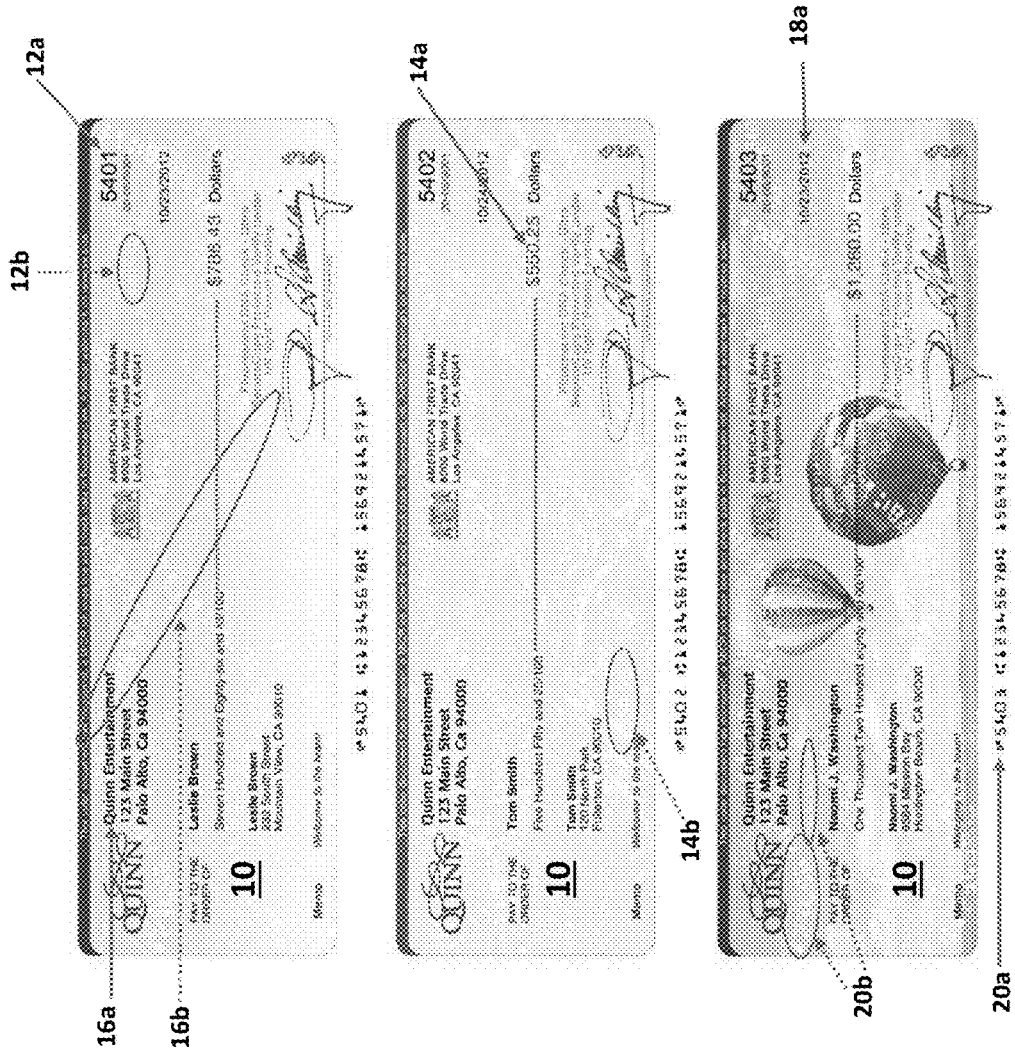
FIG. 1 depicts exemplary secured documents in the form of three verifiable checks, each referenced generally as 10 incorporating a check number 12a, check amount 14a, issuer name 16a, check issue date 18a, and banking line 20a. The elements are additionally adapted into a security architecture shown as check number element 12b, check amount element 14b, issuer name element 16b, and banking line element 20b. This schematic is a representation of the embodiments of the invention where multiple appearance of uniquely verifiable variable data in color and security inks—for instance visible and invisible magnetic, UV, IR or fluorescent—in multiple layers of visibility merged with a security color background, placed in randomly curved alignment and sizes—each item uniquely distinguished, copy protected, counterfeit safeguarded and verifiable online.

Unless defined otherwise, all technical and scientific terms used herein have the same meaning as is commonly understood by one of ordinary skill in the art to which this invention belongs. For instance, terms provided herein are commonly used in the computer arts, chemical arts and biological arts. Systems such as computer systems are considered to have suitable operating systems, software programming, memory, processing chips and the like to perform regular operations such as connection to or sharing with another computer system via the Internet, as well as receiving and executing commands as would be envisioned by one skilled in the art. To assist the reader with the scope of the invention and its many variations, below is provided a listing of terms and their meanings.

The term "security architecture" as used herein refers to the multi-presence of a plurality of security elements provided on a secured document. The term "security elements" as used herein refers to indicia, such as characters corresponding to sensitive information, printed using a secure print media and in a secure print configuration. The term "secure print media" as used herein refers to fluids for printing indicia that include a detectable characteristic or permit stimulation outside of the visible spectrum, such as UV excitable fluid, IR excitable fluid, magnetic fluid, EB and electrically charged fluid or the like. The term "secure print configuration" as used herein refers to a non-linear printing format with either systematic or variable font type, size and spacing.

The term "security library" as used herein refers to a collection of available secure print media and available secure print configurations for use in the generation of secure elements.

The term "ink" as used herein refers to a fluid, which may or may not contain a pigment or colorant, which can be readily printed on a document.

The terms "nonvisible", "invisible" "nonvisible fluid" or "invisible fluid" as used herein refers to the inability of an ordinary observer, with an unaided eye, to identify the presence of a marking printed using a secure fluid. This is accomplished through the use of colorless fluids, fluids that emit color outside of the visible spectrum, fluids that emit a color within the visible spectrum but at an amount that is not readily detectable by the human eye, fluids that require excitation, such as a UV light source, to emit color in the visible spectrum and the like.

As an introduction, the invention provides a verifiable security document system, which generates a security architecture from sensitive information, secure print media and secure print configurations and the printing of the security architecture on a document to form a secured document. The security of the document system is further heighted by communications between the validation center and the document issuer and between the validation center and recipient of the document.

The security architecture includes sensitive data in multiple information layers and preferably aligned in non-linear, randomly real-time computed security patterns. Most preferably documents are printed using print media that is nonvisible to the human eye, such that all copies of sensitive data are not readily visible to the unaided human eye. Reading or detecting security elements and thus authenticating the sensitive data therein is performed using suitable energy or light sources, readers or detectors, such as magnetic character readers, fluorescent light sources or detectors, UV light sources or readers, IR readers, e-beam or alternative energy sources and the like. In further embodiments reading of a security architecture may include bio-complementation through selective electromagnetic interference in the non-visible range of the light spectrum. The security architecture is delivered on physical media such as documents using a full color all digital demand printing process that includes an ink security suite, which itself includes secure print media, such as magnetic fluids, fluorescent fluids, UV fluids, IR fluids, nucleic acid fluids or the like.

The system may be further enhanced by communications i. between the validation center and the document issuer and ii. between the validation center and the document recipient. Among the communications may include an online verification procedure to ensure the issuer's identity, the recipient's identity, contact information, account number, payment amount and the like. Still further, the system can be enhanced by monitoring the transfer of ownership, delivery and clearing process of the document through periodic communication with the validation center. Security may be further enhanced by requiring an inquiring party reveal its own contact information and identity before authenticating a received document or prior to generation of the secured document as well as following up with data after printing. In this aspect, additional enhancements are made by the validation system that will communicate systematically and cyclically between issuer and recipient before, during, and after processing of secure data, which allows essential feedback for risk prevention and security tracking to ensure that the secure data is not compromised at any leg of the transaction. The validation center creates a fraud proof system from start to finish and beyond.

The above is accomplished in part through the development of a validation center to authenticate originality of sensitive information prior to and after its printing on a document. Printing relies in part on an all digital full color printing means and a security ink suite containing inks or fluids responding to visible and non-visible methods of detection (e.g. DNA/RNA oligomers, magnetic particles, UV, IR active fluorophores, quantum dots, or other small excitable molecules and emitting nanoparticles) for printing the multi-appearance of sensitive information.

While the invention will be useful for the generation of a variety of secured documents, the invention is particularly useful for printing of checks. Checks themselves may be filled out offline, such as by requiring the issuer identify sensitive data such as payee, check amount or issue date after the check has been printed; however checks filled out online may have still further security features. Even when filled out offline, checks preferably have sensitive information such as issuer name, check number, bank information such as routing number and account information and the like securely printed within the security architecture. Thus, in some instances the issuer may fill out the payee, date and amount then provide the check to the recipient. Although the issuer may fill out this added data, the issuer may nonetheless transmit this data to the validation center for added security. In other instances the check is filled out online then sent to the recipient. In such instances, security may be further heightened by incorporating sensitive data such as date, payee, amount and the like into the security architecture.

Turning now to the drawings, FIG. 1 depicts three exemplary secured documents in the form of three checks 10. The security architecture provides conventional printing of check number 12a check amount 14a, issuer name 16a, and check date 18a in visible ink combined with a multi-presence of the information printed in UV excitable fluid in random size and position, to provide a secure check number element 12b, a secure check amount element 14b, and a secure issuer name element 16b. Also shown is the banking information 20a converted to a security banking line element 20b having a random curve configuration and printed in a colorless magnetic fluid as a portion of the security architecture. These elements of check number, check amount, issuer name etc. are not limited to those described in FIG. 1, certainly any additional sensitive information relative to the document can be transformed into secure information by printing with the security ink suite.

As introduced above, documents, such as checks 10, are preferably printed using a security architecture that involves a plurality of security elements. Most preferably printing of sensitive information, such as banking information 20b, check amount 14b, check number 12b and the like, is securely printed in multiple copies having varying configuration and using a secure print media. By printing the sensitive information in multiple copies the potential forger must not only forge traditional or conventional data but would also be required to forge each of the multiple copies in the various configurations in addition to using various print media. As such the printed document or check 10 itself has increased security features. Exemplary security features, also referred to security elements, are discussed in more detail below.

Figure 2:
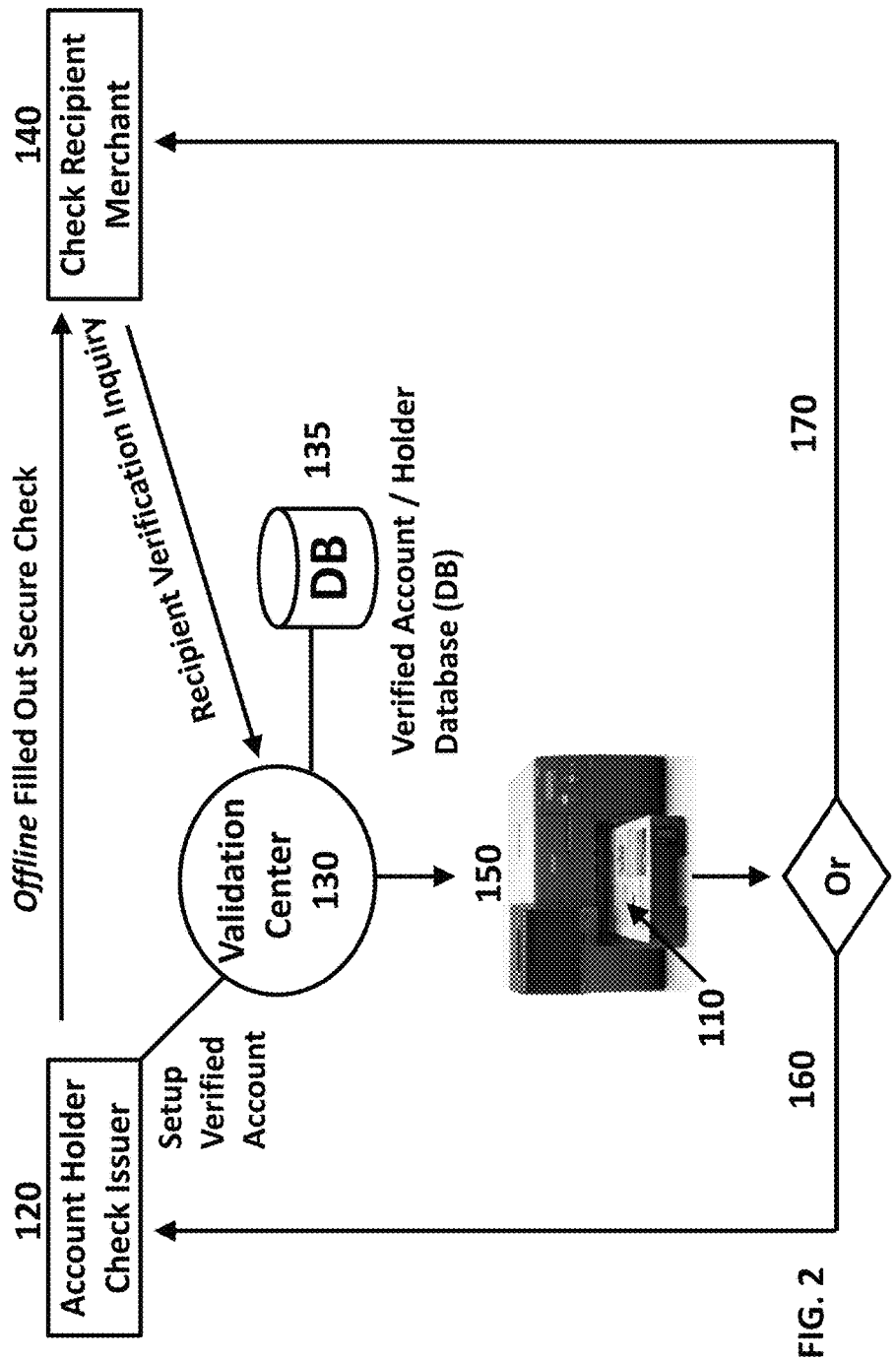
FIG. 2 is a simplified schematic depicting an overview of a sheet to mail security document system 100 for the manufacturing of sheets or individual checks 110. Depicted is the communication between account holder or check issuer 120, validation center 130, which is operably connected to a database 135, and recipient 140. Prior to generating checks 110, sensitive information is confirmed with the recipient 140 by the validation center 130 thereby increasing security of the system 100. A print file or print instructions are generated and the validation center 130 sends instructions to a printer 150 for the printing of a check 110. The printed check 110 can then be sent to the issuer 120 as an offline check 110, which may require the issuer 120 complete needed data as shown in path 160 or if all needed information is obtained by the validation center 130, the validation center 130 itself can itself include such sensitive data in the security architecture and instruct printing and direct transmission of the check 110 to the recipient 140 as shown in path 170.
Figure 3:
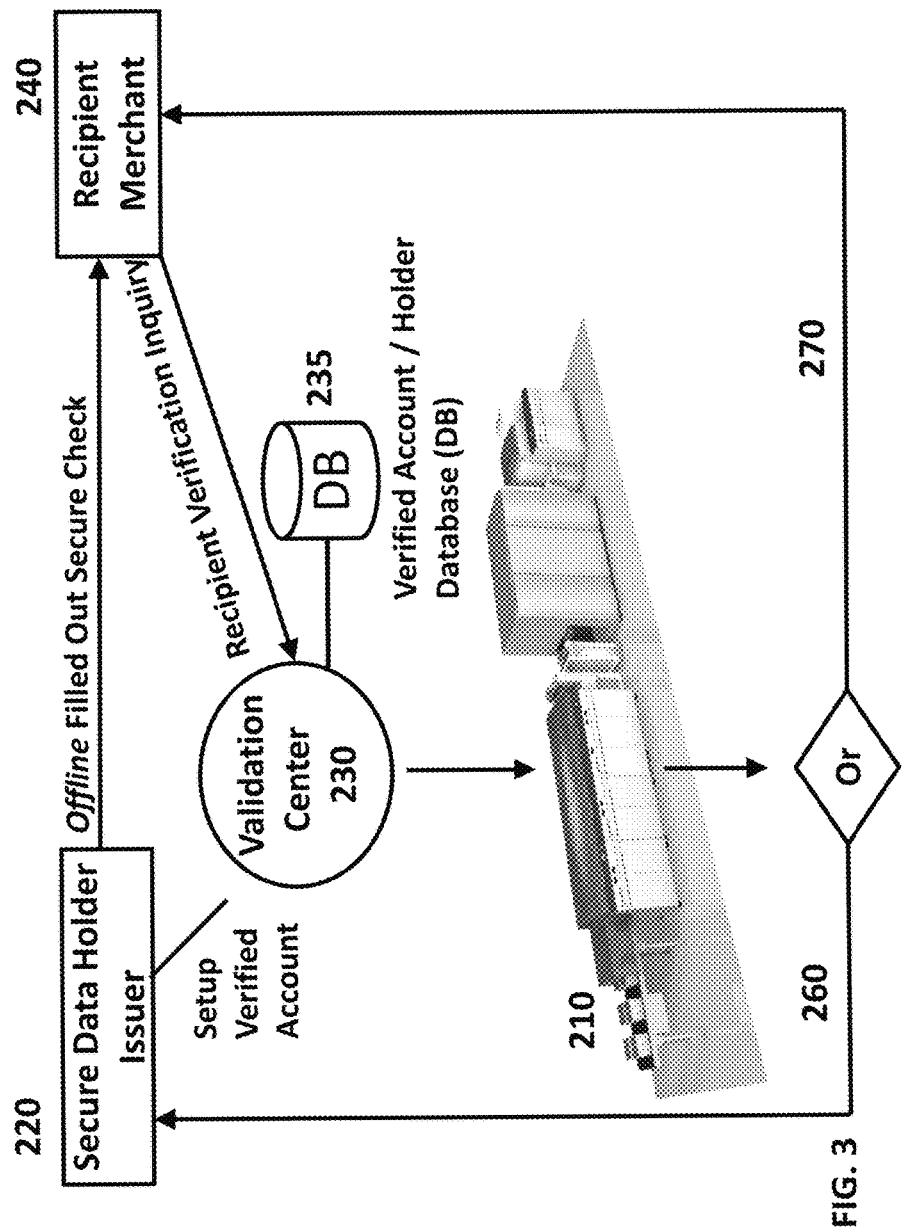
FIG. 3 is a simplified schematic depicting an overview of a roll to mail document system 200 and the communication between account holder or check issuer 220, validation center 230 (connected to the operable database 235) and recipient 240. Similar to FIG. 2 the printed secure document 210 can then be sent to the issuer 220 as an offline document 210, which may require the issuer 220 complete needed data as shown in path 260 or if all needed information is obtained by the validation center 230, the validation center 230 itself can itself include such sensitive data in the security architecture and instruct printing and direct transmission of the document 210 to the recipient 240 as shown in path 270.

Referring collectively to FIGS. 1-3, in preferred embodiments, the sensitive data is provided in two or more configurations. Most preferably sensitive data is printed in a non-liner format, such as along a continuous arc, angled and the like. Generating a security architecture including arced or angled configurations can be performed using various computer algorithms such as those that generate one or more random curves and the like. Preferably the configuration is generated in real-time as the data is provided to the validation center 130, 230. Alternatively, after the generation of a suitable curve, the indicia or data string corresponding to the sensitive data is provided thereby forming the image for printing. Most preferably multiple images are generated, each having a different print configuration and thus different curve, angle, font, spacing or the like. As such, the validation center 130, 230 is preferably loaded with programming for the generation of suitable configurations, such as random curves and the formation of images along the configuration from a string of sensitive information. One skilled in the art will appreciate that in addition to curves or angles, increased security may be achieved by providing data in various random fonts, sizes, spacing and the like, which may differ between copies of a same data string. In some instances data is also printed in a linear format; however, preferably such a configuration would include additional security elements such as secure print media or the like. Still further, positioning of sensitive data along the document may be random such that two documents having a same data string would vary in regards to its position along the corresponding document. State of the art technology is used to implement a secure operating system for the validation center and communication pathways. The verification tools enabled are defined by critical algorithms and code used in the secure architecture which are mathematically proven to meet desired specifications.

The print media itself also provides increased security by providing characteristics that are more difficult for a forger to reproduce or modify. Suitable print media may include inks, such as magnetic inks, colored inks, colorless magnetic fluids, fluorescent fluid, invisible fluid and the like. To effectively disperse the fluid or ink, the fluids or inks themselves must have physical properties that permit their dispersion, such as suitable particle elemental composition, size, shape, viscosity, wettability, density and the like. One skilled in the art will appreciate that the physical properties will depend on the printing technique. For instance, ink jet printers can be adapted for use with the invention by providing a collection of print media as a security ink suite, which may be in the form of one or more print cartridges or tank systems. Accordingly, such print media would take in account printing capabilities of the printer, such as type of print head (thermal or piezoelectric crystal), design (fixed or disposable), nozzle characteristics, resolution and the like. Such parameters may be determined by those skilled in the particular art to which the printing technology belongs.

As introduced above, in preferred embodiments, inks or fluids are provided together as a collection in the form of an ink suite. An ink suite includes a collection of inks or fluids generally in the form of one or more cartridges, which can be individually dispersed from a printer. Such cartridges themselves may be formed using techniques known in the inkjet arts such as in the formation of inkjet cartridges, bubble jet cartridges and the like. Relatively speaking, printing of documents itself can be performed by adapting techniques known in the computer printing arts. Whereas in conventional inkjet printing droplets of ink are deposited on a substrate according to an assigned image, the embodiments of the present invention can selectively deposit droplets from the fluid contents of an ink suite to a document for generation of a secured document. As such, computer programs such as those for the generation of images on a document can be easily adapted to dispense the secured print media in the security configurations as described herein. Most printers (i.e. Epson, HP, Cannon) support a plethora of graphics and have applications to support numerous different command sets and capabilities as well as mixed text and graphics. With the existing printing interfaces/programs ever changing, there will be continuous improvements in stability and security as well as reliability and availability of printing the ink suite for secure documentation.

In a preferred approach, at least one of the security elements within the security suite is a magnetic ink or a magnetic fluid. Magnetic inks are currently used in the banking industry in a technical approach referred to as Magnetic Ink Character Recognition (MICR). The banking industry uses MICR as a character recognition technology primarily to facilitate the processing of checks. MICR characters are traditionally printed in special typefaces with a magnetic ink or toner, which usually relies on iron oxide for magnetic properties. An example of a MICR line is the format of the banking information 20a shown in FIG. 1. As a machine decodes the MICR text, it first magnetizes the characters in the plane of the paper. Then the characters are passed over a MICR read head. As each character passes over the head it produces a unique waveform that can be easily identified by the system. The use of magnetic printing allows the characters to be read reliably even if they have been overprinted or obscured by other marks, such as cancellation stamps or other non-magnetic inks. While printed inks have been used in the generation of MICR lines, the invention provides security elements that may be provided in magnetic inks that are visible and magnetic inks that are colorless and thus not ordinarily visible to the naked eye. Thus, in some embodiments, the print media is a colorless magnetic fluid, which permits enhanced security by not visually revealing the positioning of magnetic properties and thus discouraging the forging of magnetic waveforms. One skilled in the art will appreciate that in some variations the security architecture provides printing in a single string or indicia, both magnetic characters and nonmagnetic characters thereby further masking the magnetic coding region. When using inkjet printing, the printing of magnetic fluids is especially challenging since increasing particle load increases remanence; however, increasing particle load also tends to increase settling of particles and clogging of inkjet heads. Accordingly, as further guidance for the preparation of such materials, suitable viscosities are generally in the range of about 5 to about 20 cps. Fluids with a surface tension from about 25 to about 50 mN/m may also be desired and when using magnetic particles a conductivity measurement from about 0.5 to about 4 mS; and a relative magnetic permeability from about 1.2 to about 3 may be used. One skilled in the art will appreciate that advancement in magnetic fluids or inks will be adapted to the methods, systems and devices provided herein.

In some embodiments the security elements include a variety of colored inks or fluids. By printing images in a plurality of colors the color pattern itself may define portions of security architectures. In some embodiments the security elements are printed using a fluid containing a UV or IR active fluorophore and their derivatives or emissive nanoparticles, such as quantum dots or metallic nanoparticles. A fluorophore, is a component of a molecule which causes a molecule to be fluorescent. Typically a fluorophore includes a functional group within a molecule that will absorb energy of a specific wavelength and in response, emit energy at a different (but equally specific) wavelength and would thus function as suitable detection moiety. The amount and wavelength of the emitted energy depend on both the fluorophore and the chemical environment of the fluorophore. Some common fluorpores include fluorescein ($\lambda_{excitation}$=485 $\lambda_{emission}$=515), rodamine red ($\lambda_{excitation}$=568 $\lambda_{emission}$=588), Cy5 ($\lambda_{excitation}$=648 $\lambda_{emission}$=668), and the like. Depending on the wavelengths of absorption and emission, detection of the fluorophore may require a detecting device capable of emitting one or more suitable wavelengths and reading one or more emission wavelengths. Such devices will typically include an excitation source, such as a laser, an arrangement of filters or mirrors to separate the particular wavelength(s) of interest and a detector, such as a photomultiplier tube (PMT). Similarly, quantum dots are nanoparticle semiconductors that capture light and convert it into electrical energy. Different sized quantum dots emit different color light due to quantum confinement.

The wavelength of these photon emissions depends specifically on its size. Quantum dots can therefore be tuned during production to emit any color of light desired. The ability to control the emission from the quantum dot by changing its core size is valuable for creating a tunable security ink that may require a detecting device capable of emitting and reading suitable emission wavelengths, such as that obtained from a Photon Technologies (Birmingham, N.J.) QM-4/2006 spectrofluorimeter, for example. The smaller the quantum dot, the closer it is to the blue end of the spectrum, and the larger the quantum dot, the closer to the red end. Quantum dots have the advantage of being optically active and they can even be tuned beyond visible light, into the infra-red or into the ultra-violet. A technique of varying the "information content" of the ink by incorporating QD's with different diameters can also easily be achieved, for instance by designing ink formulations that contains two different sizes of CdSe/ZnS quantum dots, where the detected relative peak intensity depends on the concentration of quantum dot sizes in the ink. Therefore, compositions of ink could be continuously varied to create dynamic information content in the security architecture of the invention.

The incorporation of emitting nanoparticles in the security ink suite herein can include other examples such as metallic nanoparticles, i.e. silver or gold, which possess the quality of surface plasmon resonance (SRP). These types of metallic particles are efficient at absorbing and scattering light and the color depends on the size and shape of the particles. This strong interaction of silver or gold with light occurs because of the conduction elections on the metal surface undergoing a collective oscillation when excited by light at a specific wavelength. These particles can be used for harvesting light and for enhanced optical spectroscopies including metal enhanced fluorescence (MEF). These metallic particles are easily adapted into the security ink suite under the invention herein.

In terms of fluorescent nanoparticle solutions, the ink suite may also include organic nanoparticles, such as silica capsule designs with fluorescent dyes incorporated in the core, or polymeric nanoparticles and various dye configurations and conjugations.

In other embodiments, a black light, fluorescent or UV excitable fluid is exposed to a suitable wavelength resulting in emission within the visible spectrum thereby displaying the sensitive information. Fluids having such characteristics may be found in the chemical arts.

In some embodiments the security elements include a nucleic acid, such as a deoxyribonucleic acid (DNA) or ribonucleic acid (RNA) fragment, oligonucleotide (oligos), and the like. The term "oligomer" or "oligo" refers a short, nucleic acid polymer, such as less than about 50 nucleic acids. The charged nature of nucleic acids facilitates their suspension in polar solvents and thus permits their adoption in fluids suitable for inkjet printing. Once printed, nucleic acids can be detected alone or may be exposed to a stain to conceal or confirm their presence. Further, oligos may be useful due to their hybridization or binding to complementary nucleic acid sequences. Thus in some embodiments, oligos are used as probes to identify complementary nucleic acid sequences. Further, oligos may prove useful due to the chemistries available for linking detection moieties to nucleic acids to facilitate detection. Signal generating moieties can include fluorescent tags for direct detection or enzymes that can themselves generate detectable moieties in an indirect fashion. Still further, oligos may be useful due to chemistries available that securely bond nucleic acids to various substrates.

For an example of mixing synthetic DNA with ink for authentication security: 3 mg of double stranded DNA (double stranded to increase the durability of the DNA) is mixed with 100 ml of ink, which is composed of a colorless transparent pigment to produce an invisible ink and an IR or other UV color former added for easy detection of the printed mark. In addition, a dummy DNA sequence is added to make it difficult to analyze by someone who does not know the primary sequence and thus would not likely obtain correct primers/probes needed for detection. This type of biomimetic authentication process with its unique DNA sequence uses detection methods such as polymerase chain reaction (PCR) or capillary electrophoresis (CE). PCR is a technique used in medical, biological, and forensic laboratories for a variety of applications. It is used to amplify specific regions of a DNA strand (known as the DNA target). PCR can be used to amplify a single or multiple copies of a piece of DNA across several orders of magnitude, generating millions of copies of a particular DNA sequence. In addition to PCR amplification, capillary electrophoresis (CE) can also be utilized. Charged polymers such as DNA can be separated by filling the capillary with a gel matrix that retards longer strands more than shorter strands. In some instances, obtaining a DNA sample, such as for detection of a particular DNA sequence requires a collection step. In such instances, the document may be swabbed with a solution, such as a suitable polar solvent to collect a portion of the nucleic acid. In another embodiment a perforated portion of the document itself contains the nucleic acid and thus can be detached along the perforation for collection. Once collected, samples may be placed into a suitable vessel, tube or the like consistent with the desired detection procedure for amplification or separation of the particular sequence thereby identifying its presence or absence. The measurement and analysis of each method of detecting the DNA sequence is performed with highly specialized procedures, equipment and software. This type of authentication process provides absolute certainty about the presence or absence of specific types of DNA markers heightening the security architecture of the invention.

While the above security elements can be used to print sensitive information on documents, in some embodiments the document is formed from two or more layered sheets. In such configurations, security may be further enhanced by printing between layers. In some embodiments a detectable fluid, such as a colorless magnetic fluid is printed between layers of sheets. That is, after printing, individual sheets may be layered and bonded to form the secured document, such as by using layering and bonding technologies known in the production of multilayer papers, laminates and the like. Such a configuration decreases the likelihood of forgery since the forger would be required to manipulate a security feature encapsulated in the document itself.

The secured documents may also incorporate a number of security elements such as colored backgrounds, watermarks, and the like. In some instances charged particles are dispersed throughout the background randomly to further mask the positioning of charged or magnetic particles for encoding sensitive information. Detection or decoding of sensitive information may be performed by searching for known or predetermined security features or by scanning the entire document to detect a difference in signal frequency, polarity or intensity thereby identifying or revealing the sensitive data.

In some embodiments the security architecture includes a masking to further mask sensitive data. In some embodiments, sensitive data is printed on the document using a colorless fluid such as a UV or IR excitable fluid or magnetic fluid, followed by printing over the colorless fluid with an ink or colorant to further mask the positioning, presence or configuration of the security element. For instance, masking sensitive information may be performed by printed the information using a colorless magnetic fluid followed by printing with an opaque covering layer. Accordingly, while the sensitive data is not readily apparent by the ordinary observer, detection and reading can occur using a magnetic read head or suitable detector.

In another approach, sensitive data is masked by randomly applying charged particles in regions lacking sensitive data to further mask positioning of sensitive data. This approach may assist in preventing potential forgers from locating positioning of electric or magnetic encrypted data.

The above checks 10 are formed using the verifiable document security system, which itself includes further virtual security features (such as a validation center) in addition those physically provided in the checks (by the secure ink suite) 10 themselves. As an overview an exemplary verifiable document security systems is shown in FIG. 2, in the form of a sheet to mail document system 100 for the manufacturing of sheets or individual checks 110. As an introduction, the account holder or check issuer 120 communicates with the validation center 130, which is operably connected to a database 135, for generating a secured check 110 for sending to a recipient 140. In preferred embodiments, prior to generating checks 110, sensitive information is confirmed with the recipient 140 by the validation center 130 thereby increasing security of the system 100. This can be performed by generating and sending an inquiry to the recipient 140, which requires a response providing the sensitive information. After which the validation center 130 generates a security architecture by transforming sensitive information disclosed by the issuer 120 into a plurality of security elements through combination with various secure print media and non-linear print configurations. Once the security architecture for a secured check 110 is created, a print file or print instructions are generated and the validation center sends instructions to a printer 150 for the printing of a check 110. The printed check 110 can then be sent to the issuer 120 as an offline check 110, which may require the issuer 120 complete needed data as shown in path 160 or if all needed information is obtained by the validation center 130, such as, returning briefly again to FIG. 1, payee, check amount 14a, banking information 20a and check date 18a, the validation center 130 itself can include such sensitive data in the security architecture and instruct printing and direct transmission of the check 110 to the recipient 140 as shown in path 170. The methods may also be adapted for a roll to mail document system 200 as depicted in FIG. 3 for the manufacturing of check rolls, which increases the volume of printing. Like the system depicted in FIG. 2, an account holder or check issuer 220 communicates with a validation center 230, which is operably connected to a database 235, for arranging payment to one or more check recipients 240, and thus has or establishes an account. However, whereas the sheet to mail system 100 shown in FIG. 2 provides individual checks 110 or sheets, the roll to mail document system 200 provided in FIG. 3 permits greater volume of documents or checks, such as by the formation of check rolls.

In either approach, in preferred embodiments the issuer 120, 220 of the secured data establishes an account with the validation center 130, 230. Preferably, the issuer 120, 220 communicates with the validation center 130, 230 through the use of a computer terminal, such as through the Internet, as known to those skilled in the art within the computer networking arts. Accordingly, communication with the validation center 130, 230 is preferably akin to a master and slave computer network where the master computer system permits contact by the slave computer system, such as through the Internet. As such, the account holder or issuer 120, 220 can establish a user account with the validation center 130, 230, generate a user profile and the like as known in the computer arts. This account information can be stored, maintained, retrieved and updated by the validation center 130, 230 through communication with a database 135, 235. Once an account is established the issuer 130, 230 can log on to the system to order or instruct the generation of a single secured document, order one or more sheets of documents, and the like. In preferred embodiments, banking information such as routing and account number is confirmed while the user account is established. In preferred embodiments the issuer 120, 220 will be provided the opportunity to provide offline checks 160, 260, which refers to checks 10, 110 sent to the issuer after printing; and online checks 170, 270, which refer to checks 10, 110 sent to the recipient 140 after printing.

Preferably, the validation center 130, 230 also communicates with the recipient 140, 240 such as through a recipient merchant computer terminal. Most preferably the recipient 140, 240 also has a user account with the validation center having stored account information in the database 135, 235. Communication between validation center 130 and recipient 140 may be initiated by the validation center 130, 230 such as to verify a potential payment from the issuer 120, 220, to schedule a series of payments, to notify the recipient 140, 240 that a document is being sent, to verify the address of the recipient 140, 240, to notify the recipient 140, 240 of the security architecture provided in the secured document to permit the recipient 140, 240 to confirm the authenticity of a secured document and the like. Alternatively, communication may be initiated by the recipient 140, 240, such as to verify the authenticity of a received document, to request issuance of payment and the like.

Figure 4:
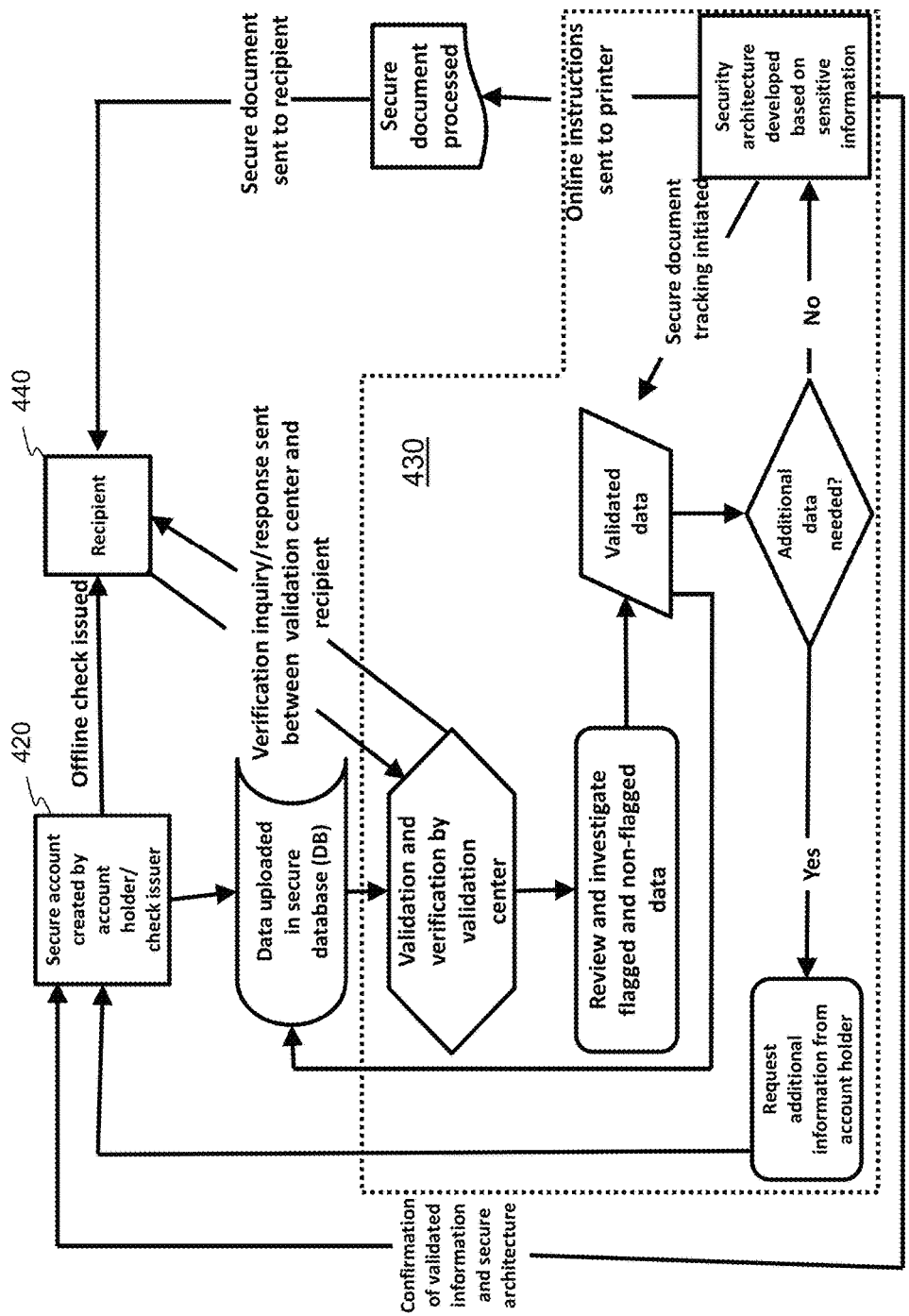
FIG. 4 is a general and simplified flow chart depicting communication steps between validation center 430 with the account holder/check issuer 420 and the recipient 440. The data entries goes through verification and validation by the validation center with feedback at each step of the process to insure that all data is valid and sufficient for generating the security architecture based on received information.

A basic overview of the processes and communication pathways between i. the account holder/check issuer and the validation center and ii. the recipient and the validation center is schematically represented in a flow chart shown in FIG. 4. The resultant secure document is processed either offline or online after a series of review and tracking of the validation center, ultimately operable by the database. The data entries goes through verification and validation by the validation center with feedback at each step of the process to insure that all data is valid and sufficient for generating the security architecture based on received information.

While FIGS. 2-4 have shown a series of systems for validation of information BEFORE printing, FIG. 5 takes into account the feedback follow-up system 300 for tracking and fraud prevention AFTER the secure data has been processed. FIG. 5 shows the additional embodiments of the invention of the secure system, where the secure data holder (SDH) 320 has transaction and systematic cyclic communication between the validation center 330 and an authorized recipient 340 shown pictorally as pathway (B), and a primary authority (PA) (i.e. bank institute) to ensure authenticity of data before, during, and after secure document printing. Furthermore, the SDH 320 has the ability for real time interference (D) with a print client 332 if data is flagged, which includes the ability to halt the secure data from processing based on validation center 332 notifications (denials or confirmations of data). The SDH 320 can report the data to the PA as flagged based on risk evaluations (C).

In FIG. 6 a summary of a use case for check processing and an overview of interactions with the validation center VC to ensure fraud protection of documents is showcased. Specifically, FIG. 6 describes in more detail the essential steps from start to finish of authentication of secure data SD based on intimate communication, feedback, and follow-up by the validation center VC for heightened security and processing of secure documents, such as checks.

An exemplary method employing a validation process, which includes the secured data holder SDH passing or transferring secured data SD to the validation center VC is shown in box 1 and is as follows. The validation center VC passes the secured data SD to the primary authority PA in addition to a secret token ST. Generation and use of secret tokens, such as those formed by software programs, are known to those skilled in the computer arts. The primary authority PA validates the security data SD and passes or provides the secret token ST to the secured data holder SDH. The secured data holder SDH then passes the secret token ST to the validation center VC. If all is successful the secured data holder SDH is validated, the secured data SD, secret token ST and secured data holder SDH provide a real-time alert method stored in the validation center database VCDB.

An exemplary method employing a validation center VC data verification cycle before or while the secured document SD is shown in box 2 and is as follows. The secured data holder SDH passes secured data SD to an authorized recipient merchant ARM and/or authorized print client APC. The authorized recent merchant ARM and/or authorized print client APC generate and send a request to the validation center VC. The validation center VC forms a query to evaluate the request and denies or confirms the request. If confirmed, the authorized recipient merchant ARM and/or authorized print client APC can proceed to print the secured data SD with DNA security. Secured data holder SDH is alerted in real-time of the print event and notified of unique transaction details and identity ID of authorized recipient merchant ARM and/or authorized print client APC. Authorized recipient merchant ARM and/or authorized print client APC are notified of the validation center's VC's security data holder SDH alert notification. In addition, notification is also coupled with the option for the security data holder SDH to interfere with the transaction. In preferred embodiments, noninterference signals transaction validity to authorized recipient merchant ARM and/or authorized print client APC.

An exemplary method employing a validation center VC data verification cycle after a secured document SD is printed and has been circulated is shown in box 3 and is as follows. After self creation or receipt of blank security data SD from authorized print client APC, Secured data holder SDH passes DNA printed secured data SD to authorized recipient merchant ARM. Authorized recipient merchant ARM generates and sends a request to validation center VC, such as by entering secured data SD through an online connection (such as using a suitable scan or manual entry). Validation center VC generates and performs a query of the provided secured data SD and denies or confirms the request. Secured data holder SDH is either a) alerted in real-time of circulated printed secured data SD and notified of unique transaction details and identity ID of authorized recipient merchant ARM and/or authorized print client APC; or b) receives DNA printed secured data SD through primary authority PA (such as a canceled check) with DNA secure features, such as validation center VC verification contact data and options to prevent/interfere. Authorized recipient merchant ARM is notified of validation center's VC's secured data holder SDH alert notification. Secured data holder SDH is provided the opportunity to interfere and preferably non-interference signals transaction validity to authorized recipient merchant ARM.

Exemplary methods addressing the secured data holder's SDH's interference options in the event of unauthorized secured data SD printing are shown in box 4 and are as follows. Secured data holder SDH can inform authorized recipient merchant ARM or authorized print client APC of the unauthorized activity and instruct reversal or halt of the underlying transaction. Secured data holder SDH can inform print authority PA to the flag the secured data SD as compromised and halt secured data SD processing. Secured data holder SDH can inform validation center VC to flag secured data SD has compromised. Secured data holder SDH can originate new secured data SD.

In view of the above, one skilled in the art will appreciate that the validation center 130, 230, 330 provides a secure bridge between an issuer 120, 220, 320 of a secured document and the corresponding recipient 140, 240, 340. This bridge provides further verification of a document's authenticity through communication between each of issuer 120, 220, 320 and recipient 140, 240, 340; and is further advanced in part through the generation of a complex architecture of security elements including sensitive information in or on the document in secure print media and configurations and optionally the corresponding decoding or authentication of the security architecture.

Confirming the authenticity of a secured document may require the recipient 140, 240, 340 detect the sensitive information by exposing the document to a suitable light source or detector such as visible, UV, IR light or alternative energy (EB for example) source, a magnetic read head, a nucleic acid sequence detector or the like as required by the particular security elements thereby revealing the multi-presence of sensitive data. In other embodiments data is collected by the recipient 140, 240, 340 then provided to the validation center 130, 230, 330 for authentication. In other embodiments, the validation center 130, 230, 330 transmits information, such as an image depicting securely encoded images for comparison by the recipient 140, 240, 340.

Referring again to FIGS. 1 and 2, a security architecture can be generated by the validation center 130 in response to data communicated by the issuer 120 and verified by the recipient 140, see also FIG. 4 flow chart description of communication pathways. When using an offline approach 160, banking information 20a such as bank routing number, account number, check number 12a and the like can be printed as instructed by the validation center 130, namely in multiple copies, in non-liner fashion, using a secure print media and the like to form security elements such multiple bank information elements 20b and multiple check number elements 12b. The document or sheets are then sent to the issuer 140 for transfer to the recipient 140. Accordingly, the issuer 120 may be required to add any remaining needed information, such as payee, check amount 14a and or the like. In an online approach the validation center 130 receives all needed information, such as banking information 20a, check number 12a, payee, check amount 14a, date 18a and the like, generates a security architecture incorporating each into multiple security elements, instructs printing of the secured document or sheet of documents with the security architecture and transfers the document without requiring further assistance by the issuer 120. The features of the validation center 130 are now considered in more detail.

In preferred embodiments the validation center 130, 230, 330 generates a security architecture for use in the printing of a secured document by assigning to indicia or a data string a suitable print media and a print configuration, such as print format and position. As introduced above, preferably at least some of the data is provided in an energy or UV excitable or fluorescent media and as a random curve in multiple positions. Security features such as print configuration may be randomly generated using a suitable algorithm based on preferred programming. Thus, in preferred embodiments, the algorithm will generate a security architecture that is identifiable as a unique particular transaction between an issuer and recipient.

While the validation center 130, 230, 330 may generate new security architectures for each transaction entirely independent of previous transactions, the system can be adapted for preferences provided by either the issuer 120, 220, 320 or recipient 140, 240, 340. In some approaches, one or more security architectures are generated and assigned to an issuer 120, 220, 320 for repeated use. That is, an issuer 120, 220, 320 may establish a profile with the validation center 130, 230, 330 that requires one or more particular security elements in a secured document. This allows the issuer 120, 220, 320 to continue to use a preferred security architecture, which has been proven successful in prior uses. Accordingly, in some instances a security architecture is assigned to the issuer 120, 220, 320 for repeated use or until the issuer 120, 220, 320 chooses the generation a new security architecture. The choosing of security architectures may be offered in a variety of methods such as by displaying a variety of drop down menus, radio buttons and the like as known in the computer arts through a master and slave network. Further, the validation center 130, 230, 330 may display a real-time preview of security architectures for selection.

In another approach, one or more security architectures are assigned to a recipient 140, 240, 340. This feature may be preferred by merchants that require heightened security architectures compared to others or when the recipient 140, 240, 340 has the capability to decode a particular security architecture and subsequent communication with a validation center 130, 230, 330 is not desired. In this approach the recipient 140, 240, 320 may establish a profile for association of one or more particular security architectures for transmission to or use with one or more issuers 120, 220, 320. One skilled in the art will appreciate that the recipient 140, 240, 320 may also add additional data to the security architecture to provide additional data regarding the issuer 120, 220, 320 such as account type, account number, tracking information and the like. Further, by having a repeated security architecture, the recipient 140, 240, 340 may be able to decode and authenticate the document without further communication with the validation center 130, 230, 330 in instances where the security architecture may also be kept with the recipient 140, 240, 340, such as downloaded on a recipient's computer system. In some embodiments the recipient 140, 240, 340 may require the issuer's account number with the recipient 140, 240, 340 or other information printed in nonvisible fluid for secured detection by the recipient 140, 240, 340.

In still another approach, one or more security architectures are formed that integrate security elements required by the issuer 120, 220, 320 and security elements required by the recipient 140, 240, 340. This configuration may be preferred when issuer 120, 220, 320 and recipient 140, 240, 340 have a continuing business relationship. For instance, combining security elements to form a suitable security architecture may result in a security architecture that readily identifies the issuer 120, 220, 320 to the recipient 140, 240, 340 during a decoding or authenticating step. Such a configuration may permit the issuer 120, 240, 340 or recipient 140, 240, 340 to incorporate bookkeeping programming software to receive authenticated information to automatically update an issuer or recipient's account. Thus, the security architecture may allow faster processing of data entry in addition to enhanced security.

Thus both the issuer 120, 220, 320 and recipient 140, 240, 340 would require communication with the validation center 130, 230, 340 regarding the particular transaction to ensure its authentication. In some instances the security architecture is transmitted to both the issuer 120, 220, 320 and recipient 140, 240, 340. This may permit the user to print a secured document and permit the recipient 140, 240, 340 confirm the generated architecture for authentication. In other instances, the recipient 140, 240, 340 communicates with the validation center 130, 230, 330 for authentication after receipt of the secured document for its further authentication. In this approach the recipient 140, 240, 340 may scan the document with a magnetic read head, fluorescent, IR, or nucleic acid sequence detector and the like and send the resulting data file to the validation center 130, 230, 330 for authentication. One skilled in the art will recognize once the independent security architecture is generated, it can later be assigned to a corresponding issuer 120, 220, 320 recipient 140, 240, 340 and the like and thus relinquish its independent configuration.

In the embodiments of the invention, for enhancement of security AFTER the secure document has been generated, the validation center will continuously monitor, verify data, and generate notifications between the issuer 120, 220, 320 and recipient 140, 240, 340, In this aspect, the validation center will constantly deny or confirm data with the purpose to prevent or interfere if a particular unauthentic transaction is taking place. Should such unauthorized data be found, the validation center will generate and send alerts to the issuer 120, 220, 320 with the option to interfere and stop the transaction. The issuer 120, 220, 320 can also report the secure data as "flagged" for unauthenticity to a greater primary authority (PA) such as a banking institute. The feedback steps for fraud prevention are described in more detail in the flow chart in FIG. 5 and the charts in FIG. 6.

Since the above documents and above methods provide the printing of sensitive data in a variety of print media, a security ink suite, which can house and deliver a plurality of diverse and secure print media has been developed. As such, a security ink suite is also provided. The ink suite permits the controlled delivery of a plurality of samples at high resolution and at high speed. In particular, each sample within the ink suite is individually addressed and is communicatively joined to a channel, which itself leads to a print head. By individually addressing a plurality of samples the ink suite permits their delivery across an array of channels via suitable programming. Thus a variety of samples, including those having various colorants or detectable characteristics, whether magnetic, fluorescent, metallic, color changing or disappearing, or biomimetic (nucleic acid) or the like, can be delivered simultaneously or sequentially.

The term "individually addressed" as used herein refers to selective control of each sample, whether a colored ink or detection fluid. Individually addressing samples is performed by communicatively connecting each of a plurality of sample housings to the programming. By controlling each fluid across an array, fluids can be delivered in numerous variations. For instance, the ink suite can include a plurality of magnetic inks, each differing by colorant, composition, or magnetic intensity. By individually addressing each magnetic ink, a mark having individual magnetic properties can be produced with various colors.

In a preferred embodiment, the ink suite includes a series of inks providing the colorant for colored printing and a series of detection fluids providing a desired characteristic, such as a magnetic property, a fluorescent property, color changing/appearing/disappearing property, biomimetic property or the like. Thus, secure marks or sensitive data can be printed using magnetic or fluorescent labeling, and the like. In some embodiments dual labeling is performed by printing in at least two secure fluids. This dual labeling may be positioned at any position along the document or chosen substrate as dictated by the programming. Further, label spectra may be spiked within a broad spectrum, requiring detection through one or more filters or filtered programming to further increase security. This can be easily achieved through the basic principles of using a series of monochromators which separate the wavelengths of light and focuses each of them onto the photodetector sequentially. Beam splitters and reference detectors will aid as light filters as well. Programs to detect the highest quantum efficiency and percentage of photons detected per wavelength can be utilized for higher accuracy.

The array of print head channels provides a path or interface to deliver the desired inks or fluids to the print head. Each ink or fluid may be assigned to a single channel within the array. In preferred embodiments the print head channels include a nozzle canal diameter of about 5-25 um. Thus, inks or fluids should have sufficient viscosity and particle size to flow through the nozzle canal. In some embodiments the array of channels arrive independently at the printing means, which itself is capable of dispersing two or more inks, whether simultaneously or sequentially. Independent channeling may increase print speed by simultaneous printing through multiple channels. Alternatively, channels may join prior to arriving at the printing means. Joining channels may assist in delivery by providing the ready combination of inks or detection fluids in a sequence of delivery packets.

The printing means may provide a single pass process or a multi-pass process. In a single pass process the print head traverses each print location during a single pass. By simultaneous and delay synchronized dispersion across the array a single pass printing process can result in a multi-color image or security mark with multiple security features. Further, by controlling sample delivery through the array of channels and dispersion via the printing means, the one pass print process accomplishes a resolution of at least 600 dpi; however, resolutions of 1200 dpi and up to about 2400 dpi are also obtained. When using higher resolution, such as about 1200 dpi to about 2400 dpi, the dispersed volume is typically about 100 pL. When performing high resolution, multi-color, single pass printing, typically a larger print head is used to accommodate the array of channels. Though non-limiting a print head adapted for use with an array of channels, which are capable of simultaneously dispersion will be about 4 inches.

When generating fluids for use with the ink suite, such as magnetic fluids, UV fluids, IR fluids, nucleic acid solutions and the like, careful consideration must be given to the fluid's viscosity. In preferred configurations, the inkjet nozzle canal has a diameter of about 5-25 um. A viscosity that is too high tends to the clog the jets or tends to bead on the surface causing an uneven printing. A viscosity that is too low tends to be "runny" when dispensed and reduces the control over the high resolution positioning of colors or images. Accordingly, when using drop-on-demand type printers such as bubble jet printers and piezoelectric printers, the preferred viscosity is less than about 20 centipoise (cp). More preferably the viscosity is about 5-20 cp. The viscosity can be adjusted by thickeners, dispersants and the like. For example, thickeners tend to decrease the viscosity thereby thickening the fluid. Dispersants however promote the distribution and separation of fine or extremely fine solid particles. Accordingly, dispersants may assist in uniformly distributing the magnetic particles throughout the fluid thereby preventing the fluid from settling. Dispersants are typically provided between about 1% and 10%.

Preferably the surface tension of each fluid is about 25 to about 50 mN/m. If the surface tension is too high the ink may not travel through the nozzle canal properly. Symptoms of improper surface tension include sporadic printing. Thus, the result may be uneven printing and varying dry times. If surface tension is too low the ink may run uncontrollably through the nozzle channel. Typically, surfactants are used to adjust surface tension. Surfactants are generally provided between 0.1% and about 5%. The skilled artisan will appreciate that the inks or fluids may also include biocides, which prevent bacterial growth; fungicides, which prevent fungal growth; buffering agents, which control the pH; humectants for controlling evaporation rate; and the like.

It will be apparent to those skilled in the art that numerous modifications and variations of the described examples and embodiments are possible in light of the above teaching. The disclosed examples and embodiments are presented for purposes of illustration only. Therefore, it is the intent to cover all such modifications and alternate embodiments as may come within the true scope of this invention.

What is claimed is:

1. A secured document comprising a security architecture having a plurality of security elements for authentication, wherein at least one security element is a same printed indicia that is printed in two or more different configurations, wherein at least one configuration is a non-linear pattern printed on the document with a fluid that is not visible within a visible spectrum, wherein the same printed indicia is a same string of alphanumeric characters and the printed string of alphanumeric characters forms a curve that is not visible within the visible spectrum.

2. The secured document according to claim 1 in a form of a check.

3. The secured document according to claim 2, wherein the printed indicia is selected from the group consisting of a check number, a check amount, a check issue date, a check issuer name, a bank routing number, and a bank account number.

4. The secured document according to claim 3, wherein the fluid is an invisible magnetic fluid, the document further comprising charged particles printed throughout the background in regions of the document that lack the printed indicia to electronically or magnetically mask positioning of the indicia printed in invisible magnetic fluid.

5. The secured document according to claim 1, wherein the same printed indicia is printed in three different positions and the curve is a random curve.

6. The secured document according to claim 1, wherein the printed indicia is ink jet printed.

7. The secured document according to claim 1, wherein the indicia is printed with a print media that is a transparent fluid.

8. The secured document according to claim 1, further comprising an additional security element as additional indicia printed with a print media selected from the group consisting of an ultraviolet (UV) excitable fluid, an infrared (IR) fluid, and a fluorescent fluid.

9. The secured document according to claim 1, further comprising an opaque cover that covers the printed indicia.

10. A verifiable document security system comprising:
a validation center that performs a verification cycle to verify transaction data between an issuer and a recipient and that generates a security architecture comprising a plurality of security elements for printing on a document, wherein the security elements comprise a same transaction data printed in two or more locations in nonlinear patterns with a print media that is outside of a visible spectrum further wherein the nonlinear patterns are different curves formed by the same transaction data, and
a printer with an ink suite comprising the print media and communicatively coupled to the validation center for printing the security architecture on the document.

11. The verifiable document security system according to claim 10, wherein the document is a check.

12. The verifiable document security system according to claim 11, wherein the transaction data is selected from the group consisting of a check number, a check amount, an issue date, an issuer name, a bank routing number, and a bank account number, further wherein each of the indicia is printed at least three or more places on a same document.

13. The verifiable document security system according to claim 10, wherein the verification cycle is performed before and after printing.

14. The verifiable document security system according to claim 10, wherein the validation center authenticates the printed document.

15. The verifiable document security system according to claim 14, wherein the verification cycle further communicates with the issuer upon denial of authenticity of the document and provides an interface to halt final processing of the document.

16. The verifiable document security system according to claim 10, wherein the validation center communicates with the issuer and the recipient to receive and validate transaction information, and wherein prior to transmitting print instructions for printing the document, the validation center confirms recipient's sensitive information through generation and sending of an inquiry to the recipient.

17. The verifiable document security system according to claim 10, wherein the printed indicia is magnetizable.

18. The verifiable document security system according to claim 10, wherein the indicia comprises magnetic characters and nonmagnetic characters in a string of characters.

19. The verifiable document security system according to claim 10, further comprising a detector for detecting or revealing the security architecture.

20. The verifiable document security system according to claim 19, wherein the detector is a UV detector or a magnetic read head.

21. A verifiable document security system comprising:
a validation center that performs a verification cycle to verify transaction data between an issuer and a recipient and generates a security architecture comprising a plurality of security elements for printing on a document, wherein the verification cycle is performed before and after printing a document with the security elements and the security elements comprise a same printed indicia that is printed in two or more different configurations, wherein at least one configuration comprises a string of alphanumeric characters forming a curve that is not visible within the visible spectrum; and
a print authority comprising printer with an ink suite communicatively coupled to the validation center and configured to print the security architecture on the document, wherein at least one ink within the ink suite is not visible within the visible spectrum and prints indicia that can be magnetized.

22. A method of employing a validation cycle, comprising:
providing the verifiable document security system according to claim 21;
receiving a request from the recipient to the validation center;
querying the request for acceptance or denial; and
if accepted sending print instructions to the print authority, sending a notification to the issuer of transaction details and identification of recipient, and notifying the recipient of the notification sent to the issuer.

* * * * *